United States Patent [19]
Ward

[11] 3,931,644
[45] Jan. 6, 1976

[54] JACKET FOR A MAGNETIC DISK RECORDING ASSEMBLY

[75] Inventor: Paul F. Ward, San Jose, Calif.

[73] Assignee: Information Terminals Corporation, Sunnyvale, Calif.

[22] Filed: Mar. 3, 1975

[21] Appl. No.: 554,994

[52] U.S. Cl. .................. 360/133; 206/312; 360/86; 360/99
[51] Int. Cl.² .................. G11B 23/02; G11B 25/04
[58] Field of Search .......... 360/133, 132, 135, 137, 360/97, 86, 99; 206/312

[56] References Cited
UNITED STATES PATENTS

| | | | |
|---|---|---|---|
| 3,416,150 | 12/1968 | Lindberg, Jr. | 360/133 |
| 3,662,360 | 5/1972 | Lambert | 360/133 |
| 3,668,658 | 6/1972 | Flores et al. | 360/97 |
| 3,678,481 | 7/1972 | Daiziel et al. | 360/99 |
| 3,770,908 | 11/1973 | Craggs | 360/133 |
| 3,815,150 | 6/1974 | Stoddard | 360/97 |
| 3,845,502 | 10/1973 | Paus | 360/97 |

Primary Examiner—Alfred H. Eddleman
Attorney, Agent, or Firm—Townsend and Townsend

[57] ABSTRACT

An assembly comprised of a flexible, magnetic recording disk and a jacket or envelope which houses the disk in a manner such that the disk can rotate in the jacket under the influence of a conventional disk drive. The jacket has a notch at one corner thereof to provide a write enable function for the assembly when used with the disk drive. A rigid member is provided adjacent to the notch to close the opening formed thereby between the two sides of the jacket and to reinforce the corner to prevent structural damage to the jacket when used with the disk drive. The jacket is formed from an initially flat sheet of material and, except for the aforesaid rigid member, there is no structure between the outer periphery of the disk and the adjacent margin of the jacket.

10 Claims, 3 Drawing Figures

U.S. Patent  Jan. 6, 1976  3,931,644
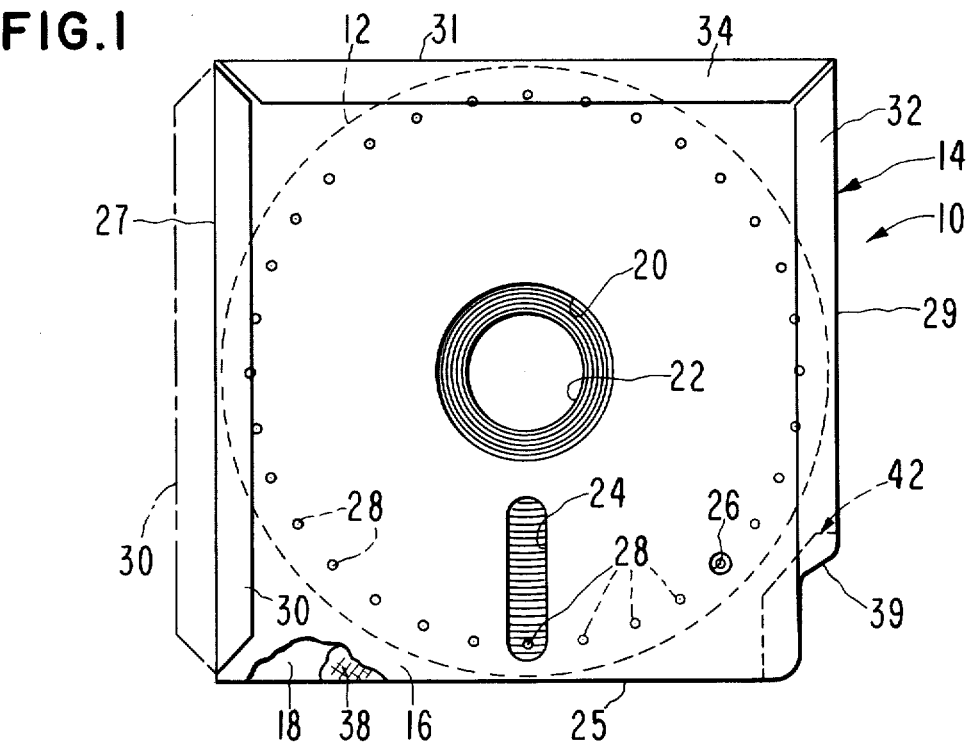
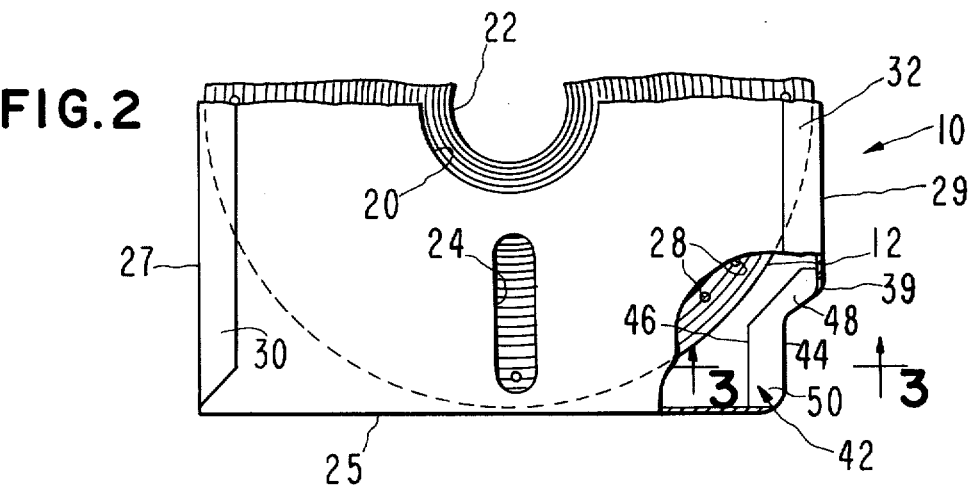
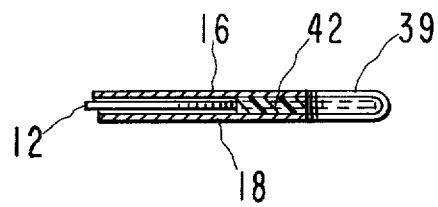

JACKET FOR A MAGNETIC DISK RECORDING ASSEMBLY

This invention relates to improvements in magnetic storage media of the type utilizing a flexible, magnetic disk known as a "floppy" disk usable with a conventional disk drive. More particularly, the invention relates to a magnetic disk recording assembly in which the jacket which houses the disk is of a simple and rugged construction to provide a write enable feature for the assembly while assuring a rugged construction therefor.

BACKGROUND OF THE INVENTION

Conventional disk drives for magnetic recording purposes utilize a magnetic recording disk unit including a disk of flexible material rotatably carried in a jacket of a relatively stiff material, such as stiff plastic or the like. A leading disk unit which has been commercially available for a number of years is formed by sandwiching a generally square, rigid plastic member between a pair of stiff plastic sheets with the plastic member having a circular opening therethrough in which the magnetic disk is rotatably disposed. Thus, the plastic member retains the disk between the sheets and substantially rigidifies the jacket portion surrounding the disk which is unnecessary and increases production costs.

Other types of jackets for magnetic disks are of similar complexity. They, therefore, suffer the same drawbacks as the jacket described above.

A need has, therefore, arisen for a jacket for a magnetic disk which is simpler in construction than that of conventional types yet the disk is adequately protected at all times within the jacket and the jacket itself can have a write enable function in the same manner as those of conventional disk units.

SUMMARY OF THE INVENTION

The present invention is directed to a magnetic disk recording assembly which has an improved jacket for housing a magnetic recording disk and also has a notch at one corner of the jacket for providing a write enable function therefor. The jacket is preferably made from a single sheet of material, such as relatively stiff plastic, the sheet being doubled upon itself along a fold line to form a pair of jacket sides. Means is provided for connecting the outer margins of the sides to present a disk-receiving space therebetween. Preferably, such connecting means comprises a number of flaps on one of the sides which partially overlap the other side and are secured, such as by a heat seal or by an adhesive, to the other side.

The sides have a central aperture therethrough for alignment with the central hole of the disk. One of the sides has a radial slot therein for permitting the magnetic coupling between the disk and a read-write head of a conventional disk drive. In the alternative, both sides of the disk can be coated with a magnetic material and both sides can be provided with the aforesaid slot. The sides are also provided with holes therethrough for alignment with circumferentially spaced holes in the disk for control purposes as the disk rotates within the jacket.

The notch formed in one corner of the jacket presents an opening between the sides and without reinforcement, the portions of the sides adjacent to the opening would eventually deteriorate through repeated use. To avoid this problem, a relatively rigid member is provided, the member being small enough to avoid interference with the rotation of the disk but large enough to close the opening and to reinforce the region adjacent thereto. Thus, the member reinforces the region adjacent to the notch to prevent structural damage to the jacket, thereby assuring its repeated usage over an extended period of time.

The primary object of this invention is to provide an improved magnetic disk recording assembly utilizing a rotary magnetic disk within a jacket having a write enable notch formed in one corner wherein the jacket is of improved construction and provides the practice of economies in manufacturing and handling which are not inherent in units of conventional construction.

Another object of this invention is to provide an improved jacket for an assembly of the type described wherein the jacket is free of rigidifying structure throughout its area surrounding the disk-receiving space thereof and the notch of the jacket has a small, rigid reinforcing member adjacent thereto to protect the jacket against structural damage that might otherwise occur due to repeated usage of the jacket in a disk drive.

Other objects of this invention will become apparent as the following specification progresses, reference being had to the accompanying drawing for an illustration of the invention.

In the drawings:

FIG. 1 is an elevational view of one side of the magnetic recording disk assembly of this invention;

FIG. 2 is a fragmentary, side elevational view, partly in section, of the assembly of FIG. 1, illustrating the way in which one corner of the same is reinforced by a rigid member; and FIG. 3 is an enlarged, cross-sectional view taken along the line 3—3 of FIG. 1.

The magnetic recording disk assembly of this invention is broadly denoted by the numeral 10 and includes a magnetic recording disk 12 disposed within a polygonal body or jacket 14 having a pair of opposed sides 16 and 18 (FIG. 3) which are coupled together only at their outer margins to form a space in which the disk is rotatably disposed. The shape of jacket 14 is essentially square and each outer margin is slightly longer than the diameter of the disk so that the latter is free to rotate in the jacket between sides 16 and 18 without binding or being interfered with at the outer margins of the jacket.

Sides 16 and 18 have respective central apertures 20 therethrough (FIGS. 1 and 2) in general alignment with and longer than a hole 22 through the center of disk 12. Apertures 20 allow disk 12 to be mounted on a spindle of a conventional disk drive (not shown) with the spindle being received within hole 22 of the disk so that the disk can be made to rotate under the influence of the disk drive within the space between sides 16 and 18.

One of sides 16 and 18 is provided with an elongated slot 24 which is generally radial with respect to and spaced from the corresponding aperture 20. In FIGS. 1 and 2, side 16 has the slot. Moreover, slot 24 is radially spaced inwardly from an adjacent outer margin 25 of jacket 14 as shown in FIGS. 1 and 2 and is provided to expose a radial portion of disk 12 so that a read-write head of the disk drive may be coupled to the disk and move radially thereof to read data therefrom or to write data thereon as the disk rotates within jacket 14. To this end, the surface of disk 12 facing side 16 has a magnetic coating to receive data thereon in the form of magnetic signals.

Each of sides 16 and 18 is provided with a small hole 26 (FIG. 1) at one side of and spaced from slot 24. Holes 26 of sides 16 and 18 are aligned with each other and are in the circular path of a plurality of circumferentially spaced holes 28 through disk 12. Thus, as disk 12 rotates relative to and within jacket 14, holes 28 move successively into an out of alignment with aligned holes 26 in sides 16 and 18. The purpose of holes 28 is to provide a control feature during the rotation of disk 12. A photocell and light source combination is utilized with holes 28 to effect the aforesaid control as is well-known in the magnetic disk recording art.

Housing 14 is preferably formed from an initially flat sheet of material, preferably a stiff plastic material, which is folded along a line 28 defined by margin 25 (FIGS. 1 and 2) to present sides 16 and 18 after the sheet has been stamped to form apertures 20, slot 24, holes 26 and notches in one corner of the jacket as hereinafter described. Side 18 has a pair of spaced side flaps 30 and 32 and an end flap 34 which are bent along respective lines 27, 29 and 31 and partially overlap side 16 (FIG. 1). These flaps are, as shown in FIG. 2, bonded or otherwise secured to side 16 after disk 12 has been disposed between sides 16 and 18 to close the jacket and to retain the disk therewithin. Lines 27, 29 and 31 define the other three margins of the jacket. Flap 30 is also shown in dashed lines in FIG. 1 to indicate that it extends laterally from side 18 before it is bent or folded along line 27.

Sides 16 and 18 are provided adjacent to their interfaces with disk-engaging liners 38 of suistable, static-free material. One such liner is shown in FIG. 1. These liners are well-known in the art and are provided to prevent abrasion of the surfaces of disk 12 and to minimize the build-up of static electricity due to the rotation of the disk within jacket 14.

Sides 16 and 18 are stamped to provide a notch 39 at one corner of jacket 14. The notch provides a writeenable feature for unit 10. Since this notch would present an opening between sides 16 and 18 and since the portions of such sides in this region would be free to move toward and away from each other, the same are folded at line 28 and it is necessary to reinforce this region; otherwise, the resulting portions of the sides will become weakened and eventually dog-eared, thereby preventing easy insertion of assembly 10 into a disk drive unit.

To close the opening and reinforce the corner having notch 39, a relatively rigid member 42 of plastic or the like is disposed at the corner, the member having an outer edge 44 complemental to the adjacent edges of sides 16 and 18 which form notch 39. Also, member 42 has a thickness substantially equal to the combined thicknesses of disk 12 and lines 38. The inner edge 46 of member 42 can be of any suitable shape so that the member defines a pair of relatively angularly disposed portions 48 and 50 which reinforce the entire span along the opening, yet close the same.

Member 42 is secured in any suitable manner to the inner surfaces of sides 16 and 18, such as by bonding with a suitable adhesive. Inner edge 46 of member 42 is sufficiently spaced from disk 12 so that there is no interference with the rotation of the disk within jacket 14.

If both surfaces of disk 12 are to be used for recording and playback of data, another notch 39 would be provided in the opposite corner near flap 30, i.e., the lower left-hand corner of FIGS. 1 and 2. In such a case, the other notch would be provided with a member 42 for the same purpose as that with respect to the first-mentioned notch. Also, an additional pair of holes 26 would be provided at mirror image positions with respect to the first-mentioned pair of holes 26.

With member 42 in place, jacket 14 is essentially closed on the outer periphery thereof to prevent entry of dust thereinto, yet there is no rigidifying structure between the outer periphery of disk 12 and the outer margins of jacket 14 as in the prior art. Thus, assembly 10 is of simple and rugged construction since jacket 14 is relatively self-sustaining, yet the assembly is comprised of a relatively few number of parts and jacket 14 effectively shields and supports disk 12 at all times. Also, jacket 14 is more reliable than the conventional type using a square, plastic member sandwiched between a pair of stiff, plastic sheets as described above since, in the conventional type, the glue bonding the sheets to the plastic member could dry at different rates, thereby causing the finished product to bow. Also, the disk of such a conventional unit could be caused to jam if, for instance, the glue were to run and contact the disk. Also, the disk could underlie the member or one of the two sheets due to faulty assembly, thereby causing jamming.

I claim:

1. A magnetic disk recording assembly comprising:
   a polygonal jacket having a pair of opposed, generally flat sides presenting a disk-receiving space therebetween, the jacket further having a notch at one corner thereof, the notch presenting an opening between the adjacent portions of said sides, each side having a central aperture therethrough, one of the sides having a radial slot therein extending between and spaced from the corresponding aperture and an outer margin of the corresponding side;
   a disk rotatably disposed within said space and having a central hole aligned with said apertures, said disk having a surface provided with a coating of magnetic material thereon, said surface being exposed through said slot;
   means coupling the outer margins of the sides together to retain the disk in said space; and
   means between the sides and only in the immediate vicinity of the notch for closing the opening and for reinforcing said adjacent portions of the sides.

2. An assembly as set forth in claim 1, wherein said jacket is formed from an initially flat sheet of material with the sheet being folded along a line defining one outer margin of the jacket, a first of said sides having flap means partially overlapping the other side and being secured thereto, said flap means defining said coupling means.

3. An assembly as set forth in claim 1, wherein said closing and reinforcing means comprises a relatively rigid member having an edge substantially complemental to the edges of the sides which define the notch.

4. An assembly as set forth in claim 3, wherein said member has an inner edge spaced from the disk, said jacket being free of rigidifying structure, with the exception of said member, between the outer periphery of the disk and the outer margins of the jacket.

5. A jacket for a magnetic disk recording assembly comprising:
   a polygonal body having a pair of opposed, generally flat sides presenting a disk-receiving space therebetween, said body further having a notch at one corner thereof, the notch presenting an opening between the adjacent portions of said sides, each side having a central aperture therethrough, one of the sides having a radial slot therein extending between and spaced from the corresponding aperture and an outer margin of the corresponding side, said slot being adapted to expose a portion of the surface of a disk in said space;

means for coupling the outer margins of said sides together to thereby retain a disk in said space; and means positionable between the sides and adjacent to said notch for closing the opening and for reinforcing said adjacent portions of said sides.

6. A jacket as set forth in claim 5, wherein said body is formed from an initially flat sheet of material with the sheet being folded along a line defining one outer margin of the body, a first of said sides having flap means partially overlapping the other side and being secured thereto, said flap means defining said coupling means.

7. A jacket as set forth in claim 5, wherein said closing and reinforcing means comprises a relatively rigid member having an edge substantially complemental to the edges which define the notch.

8. A jacket as set forth in claim 7, wherein said member has an inner edge spaced from the disk, said jacket being free of rigidifying structure, with the exception of said member, between the outer periphery of the disk and the outer margins of the body.

9. A jacket as set forth in claim 7, wherein said member is adhesively bonded to the inner surfaces of said adjacent portions of the sides.

10. A jacket as set forth in claim 7, wherein the member is formed of plastic and has an inner edge spaced from the outer periphery of a disk when the latter is in said space.

* * * * *